United States Patent
Luk

(10) Patent No.: US 9,504,206 B2
(45) Date of Patent: Nov. 29, 2016

(54) PLANT GRAFT PRODUCTION LINE

(75) Inventor: Ofir Luk, Moshav Neve Mivtah (IL)

(73) Assignees: HISHTIL LTD, Moshav Nehalim (IL); LUGO ENGINEERING DEVELOPMENT LTD, D.N. Hof Ashkelon (IL)

( * ) Notice: Subject to any disclaimer, the term of this patent is extended or adjusted under 35 U.S.C. 154(b) by 9 days.

(21) Appl. No.: 14/115,144

(22) PCT Filed: May 3, 2012

(86) PCT No.: PCT/IL2012/000179
§ 371 (c)(1),
(2), (4) Date: Dec. 31, 2013

(87) PCT Pub. No.: WO2012/150588
PCT Pub. Date: Nov. 8, 2012

(65) Prior Publication Data
US 2014/0109471 A1 Apr. 24, 2014

Related U.S. Application Data

(60) Provisional application No. 61/481,743, filed on May 3, 2011.

(51) Int. Cl.
*A01G 1/06* (2006.01)
(52) U.S. Cl.
CPC .............. *A01G 1/06* (2013.01); *Y10T 83/8717* (2015.04)
(58) Field of Classification Search
CPC ............................ A01G 1/06; Y10T 83/8717
USPC ........ 47/6, 8, 58.1 CF, 58.1 R; 144/28.6, 30, 144/193.2, 217, 285; 30/299, 302; 111/105; 269/287, 288; 83/178, 435.1, 455, 744, 83/745
See application file for complete search history.

(56) References Cited

U.S. PATENT DOCUMENTS 4,987,808 A * 1/1991 Sicka ....................... B26D 3/16
269/156
5,209,011 A 5/1993 Mori et al.
(Continued)

FOREIGN PATENT DOCUMENTS

FR 2541562 A1 * 2/1983 ............... A01G 1/06
FR 2541562 A1 8/1984
(Continued)

OTHER PUBLICATIONS

International Search Report of PCT/IL2012/000179, dated Aug. 21, 2012.
(Continued)

*Primary Examiner* — Kristen C Hayes
*Assistant Examiner* — Ebony Evans

(57) ABSTRACT

A plant graft production line for automatically grafting a rootstock and a scion si disclosed. The aforesaid plant graft production line comprises (a) a closed-loop conveyor; (b) at least one grafting assembly arranged for transporting along said conveyor; the assembly further comprises a rootstock holder for holding the rootstock and a scion holder for holding the scion; the holders arranged for at least partially superimposing said rootstock and scion; (c) stationary cutting mechanism for cutting exposed rootstock surface; (d) a stationary cutting mechanism for cutting a exposed scion surface to be; (e) stationary clipping mechanism for clipping the superimposed rootstock and scion together. It is a core feature of the invention to provide the rootstock holder arranged so as to provide a curvilinear plane along which said rootstock is conformed thereby presenting a curved cutting target for the cutting mechanism.

7 Claims, 8 Drawing Sheets

(56) References Cited

U.S. PATENT DOCUMENTS 5,414,958 A * 5/1995 Honami et al. ...................... 47/6
7,614,182 B2 * 11/2009 Oderwald ................ A01G 1/06
                                               47/58.1 CF

FOREIGN PATENT DOCUMENTS

| JP | H044817 A | 1/1992 | | |
| WO | WO 2007013804 A1 * | 2/2007 | ............... | A01G 1/06 |
| WO | 2007/144399 A1 | 12/2007 | | |
| WO | WO 2007144399 A1 * | 12/2007 | ............... | A01G 1/06 |
| WO | 2010/140906 A1 | 12/2010 | | |
| WO | WO 2010140906 A1 * | 12/2010 | ............... | A01G 1/06 |
| WO | 2012/150588 A2 | 11/2012 | | |

OTHER PUBLICATIONS

International Search Authority Written Opinion of PCT/IL2012/000179, dated Aug. 21, 2012.
International Preliminary Report on Patentability of PCT/IL2012/000179, dated Aug. 1, 2013.

* cited by examiner

PLANT GRAFT PRODUCTION LINE

FIELD OF THE INVENTION

The present invention relates to a grafting machine, and, more specifically, to a plant graft production line for automatically grafting a rootstock and a scion.

BACKGROUND OF THE INVENTION

Rapidly and accurately grafting the cut portions of scions onto cut rootstocks is a challenge. Hitherto, manual methods have been used, although attempts to automate this process have been made. For example, Japanese Application JP04004817A2 ('817) discloses a method for approach grafting:

A scion 2 and a stock for grafting are directed sideways and hypocotyls thereof are respectively bent and installed on each seedling holder 4 provided on the outer edges of rotating disks 3. Notches are formed in the hypocotyls with cutters 11 and 12 and the stock 1 having the cut end opened with bending of the hypocotyl is led to a place for initially carrying out grafting and the scion 2 having the similarly opened cut end of the hypocotyl is led to the aforementioned place so as to arrange the hypocotyls side by side. Mutual cut ends are meshed and the meshed parts are nipped with a grafting clip 13, taken out and placed in a pot. (Abstract).

Serious drawbacks of '817 include the fact that the means and methods rely on meshing a circular mechanism bearing the rootstocks and a circular mechanism bearing scions together. The opportunity for error and difficulties in maintaining precision are many. Hence, providing an automatic grafting and production line would fulfill an unmet and long-felt need.

SUMMARY OF THE PRESENT INVENTION

It is hence one object of the invention to disclose a plant graft production line for automatically grafting a rootstock and a scion. The aforesaid plant graft production line comprises (a) a closed loop conveyor; (b) at least one grafting assembly arranged for transporting along the conveyor; the assembly further comprising a rootstock holder for holding the rootstock and a scion holder for holding the scion; the holders arranged for at least partially superimposing the rootstock and scion; (c) cutting mechanism for cutting exposed rootstock and scion surfaces to be superimposed; and (d) clipping mechanism for clipping the superimposed rootstock and scion together.

It is a core purpose of the invention to provide the rootstock holder arranged so as to provide a curvilinear plane along which the rootstock is conformed thereby presenting a curved cutting target for the cutting mechanism.

Another object of this disclosure is to disclose the abovementioned invention wherein the rootstock holder is configured to bend the rootstock such that the rootstock is predeterminedly positioned for cutting at a predetermined angle.

A further object of the invention is to disclose the conveyor ramified into at least two branches for performing at least one operation. A further object of the invention is to disclose a plant graft production line for automatically grafting a rootstock and a scion. The aforesaid plant graft production line comprises a closed loop conveyor; at least one grafting assembly arranged for transporting along the closed loop conveyor; the assembly further comprising a rootstock holder for holding the rootstock and a scion holder for holding the scion; the holders arranged for at least partially superimposing the rootstock and scion; cutting mechanism for cutting exposed rootstock and scion surfaces to be superimposed; (c) clipping mechanism for clipping the superimposed rootstock and scion together. The rootstock holder is arranged as an at least three point grip. The holder comprises a supporting member having a rounded top arranged to support the rootstock and clamping elements. The cutting mechanism is arranged to angularly cut the scion at a predetermined angle.

A further object of this disclosure is to disclose the abovementioned invention wherein the cutting mechanism is arranged to angularly cut the scion at a predetermined angle of about 30°

A further object of this disclosure is to disclose the abovementioned invention wherein the grafting assembly is arranged for transporting along a guiding rail.

A further object of this disclosure is to disclose the abovementioned invention wherein the scion holder comprises a clip for holding the scion.

A further object of this disclosure is to disclose the abovementioned invention wherein the scion holder comprises a support for a cut scion.

A further object of this disclosure is to disclose the abovementioned invention wherein the grafting assembly is configurable to a first position for loading the rootstock and scion and a second position for superimposing the cut rootstock and the cut scion.

A further object of this disclosure is to disclose the abovementioned invention wherein the grafting assembly comprises a mechanism arranged for approaching the rootstock and scion holders; the mechanism is selected from the group consisting of a mechanical mechanism, an electrical mechanism, a pneumatic mechanism and any combination thereof.

A further object of this disclosure is to disclose the abovementioned invention wherein the support is adapted to be drawn aside when assembly is in the second position.

A further object of this disclosure is to disclose the abovementioned invention wherein the cutting mechanism further comprises (a) a cylindrical holder and (b) a plain blade placed into the holder, wherein the blade is under tension. The cutting is performed by a convex curve edge of the tensioned blade A further object is to disclose the grafting machine having (a) a combined holder adapted for holding a root stock and a scion; (b) a mechanism adapted for linear displacement of the combined holder along a longitudinal axis; and (c) operating tools including a knife adapted for cutting the root stock. The knife is configured for angularly cutting the scion. The clip is adapted for holding together during a period of grafting. The operating tools are located along the longitudinal axis. Each tool is operatively linked such that the tools are synchronically actuated when the combined holder is displaced into a predetermined position designed for performing a corresponding operation.

A further object is to disclose a hybrid plant graft produced by a method comprising a step of (a) obtaining a plant graft production line for automatically grafting a rootstock and a scion; the plant graft production line comprising (i) at least one grafting assembly arranged for transporting therealong; the assembly further comprising a rootstock holder for holding the rootstock and a scion holder for holding the scion; the holders arranged for at least partially superimposing the rootstock and scion (ii) cutting mechanism for cutting exposed rootstock and scion surfaces to be superimposed; (iii) clipping mechanism for clipping the superimposed rootstock and scion together; the rootstock holder is arranged as a three point grip; the holder comprises a supporting member having a rounded top arranged to support the rootstock and clamping elements; the cutting mechanism is arranged to angularly cut the scion at a predetermined angle; (b) mounting the rootstocks and the scions in the rootstock holder and the scion holder respectively and operating the plant graft production line and (c) operating the plant graft production line.

A further object is to disclose the hybrid graft selected from the group consisting of grafted melon, grafted cucumber, grafted eggplant, grafted tomato and grafted basil.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, alongside all chapters of the present invention, so as to enable any person skilled in the art to make use of the invention and sets forth the best modes contemplated by the inventor of carrying out this invention. Various modifications, however, are adapted to remain apparent to those skilled in the art, since the generic principles of the present invention have been defined specifically to provide a plant graft production line for automatically grafting a rootstock and a scion.

Figure 1:
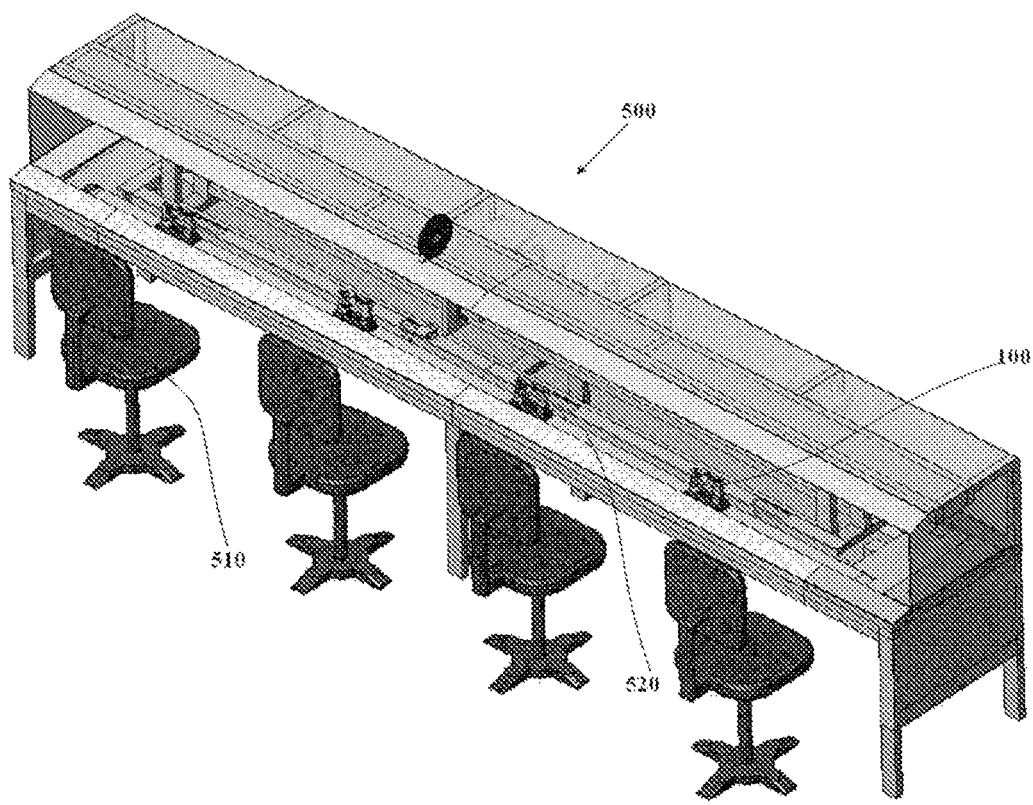
FIG. 1 is a general view of a plant grafting production line.

Reference is now made to FIG. 1, presenting a production line 500 for automatically grafting a rootstock and a scion. The aforesaid production line 500 comprises a closed loop conveyor 520 carrying at least one grafting assembly 100 arranged for transporting along the conveyor. The assembly 100 comprises a rootstock holder for holding the rootstock and a scion holder for holding the scion. Working seats 510 are designed for production line operators which manually load the assembly 100 with rootstocks and scions and unload resulting grafts gripped by clips (not shown). During movement of the assembly 100 carried by the loop conveyor 520, the following operations are performed.
1. Loading the combined holder 100 with the rootstock and the scion manually (not shown);
2. Cutting the scion;
3. Cutting the rootstock;
4. Clipping the scion to the rootstock;
5. Quality monitoring and bedding (manually).

In accordance with one embodiment of the current invention, the conveyor can be ramified into at least two branches for performing at least one operation. More time-consuming operations are performed at the ramified portions of the production line. Temporary parking of the assemblies 100 with rootstocks and/or scions at a paused branch of the conveyor 520 is in the scope of the current invention.

Figure 2:
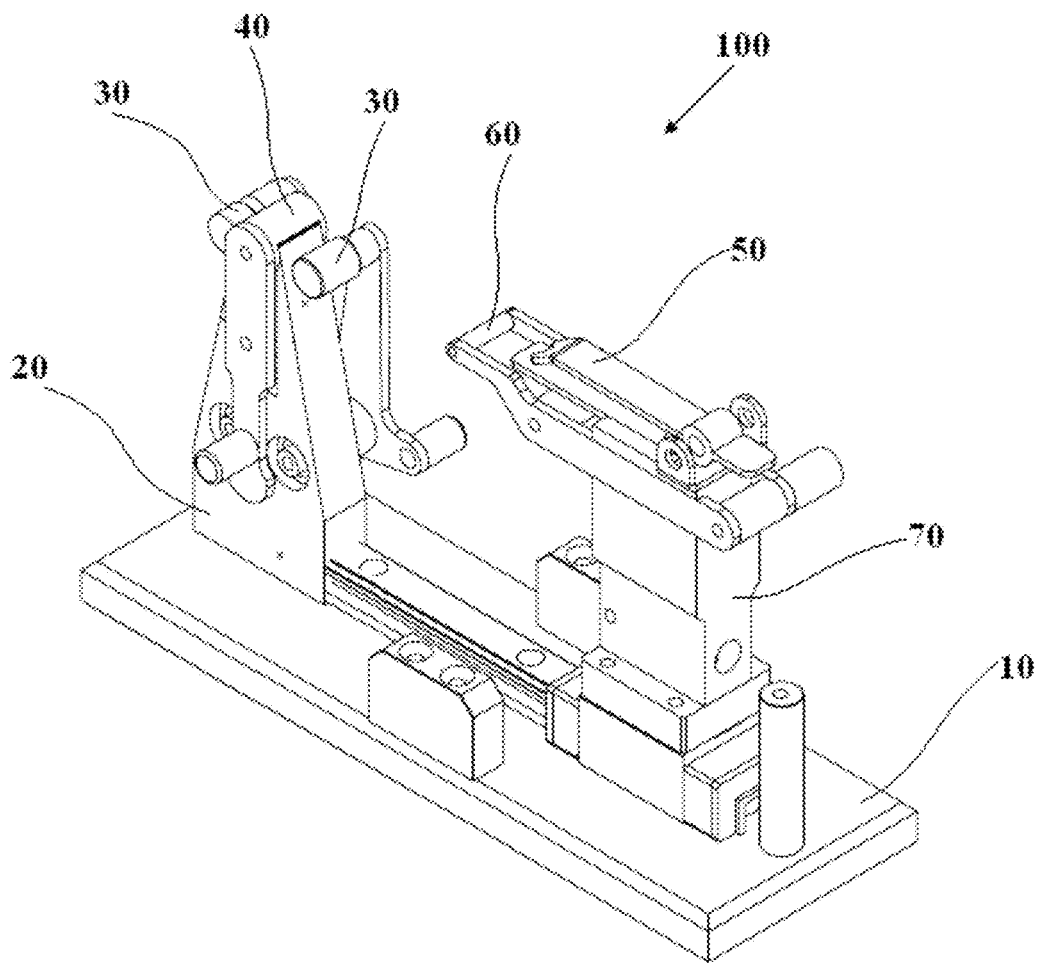
FIG. 2 is a schematic view of a combined holder.

Reference is now made to FIG. 2 presenting an enlarged view of the combined grafting assembly 100. The aforesaid assembly 100 comprises a base plate 10, a root stock holder 20 provided with a central spring-biased support 40 and two side gripping members 30, and a scion gripper 70 provided with a spring-biased jaw 50 and spaced apart support 60.

Figure 3:
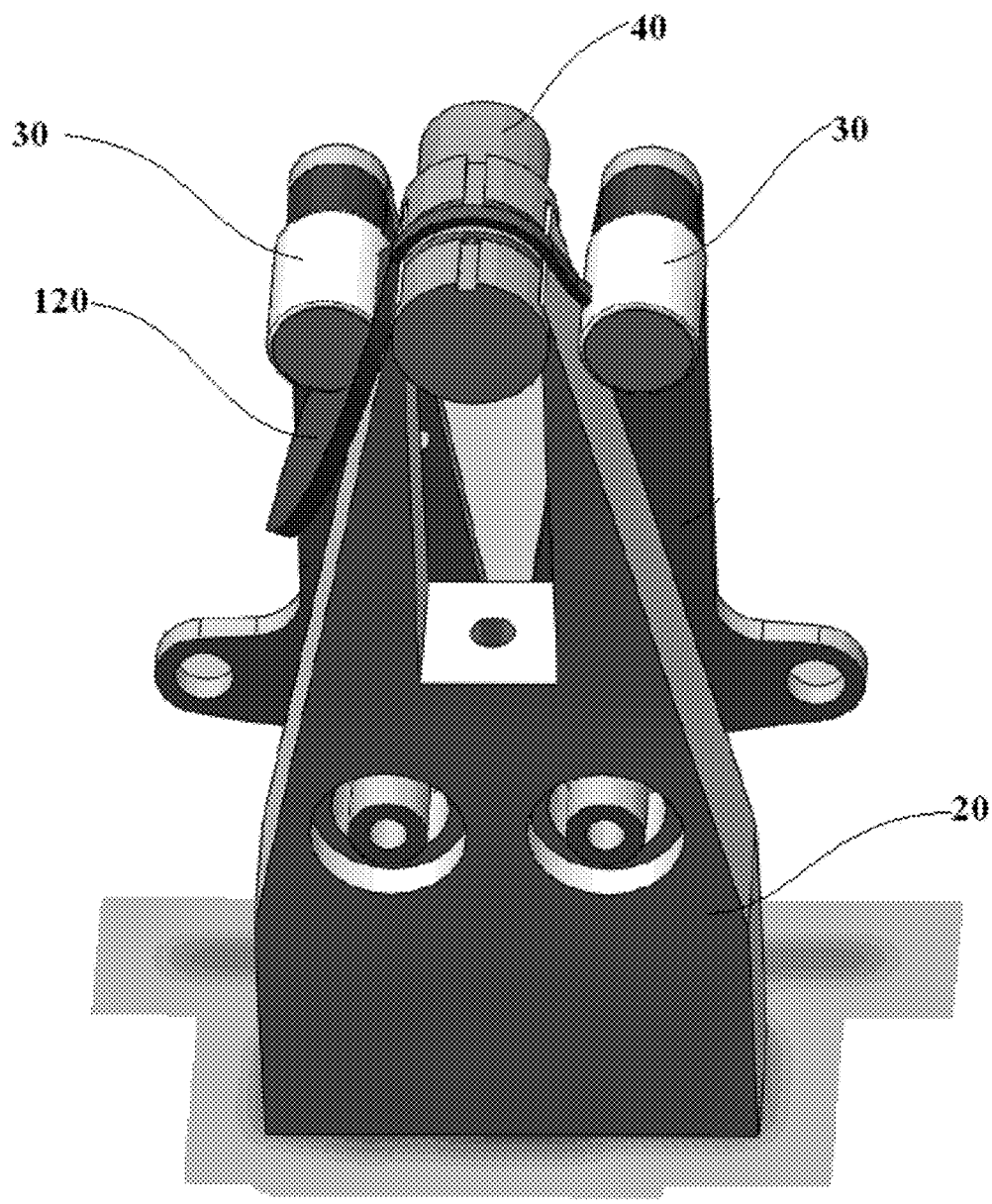
FIG. 3 is a schematic view of a three-point holder holding a rootstock.
Figure 4:
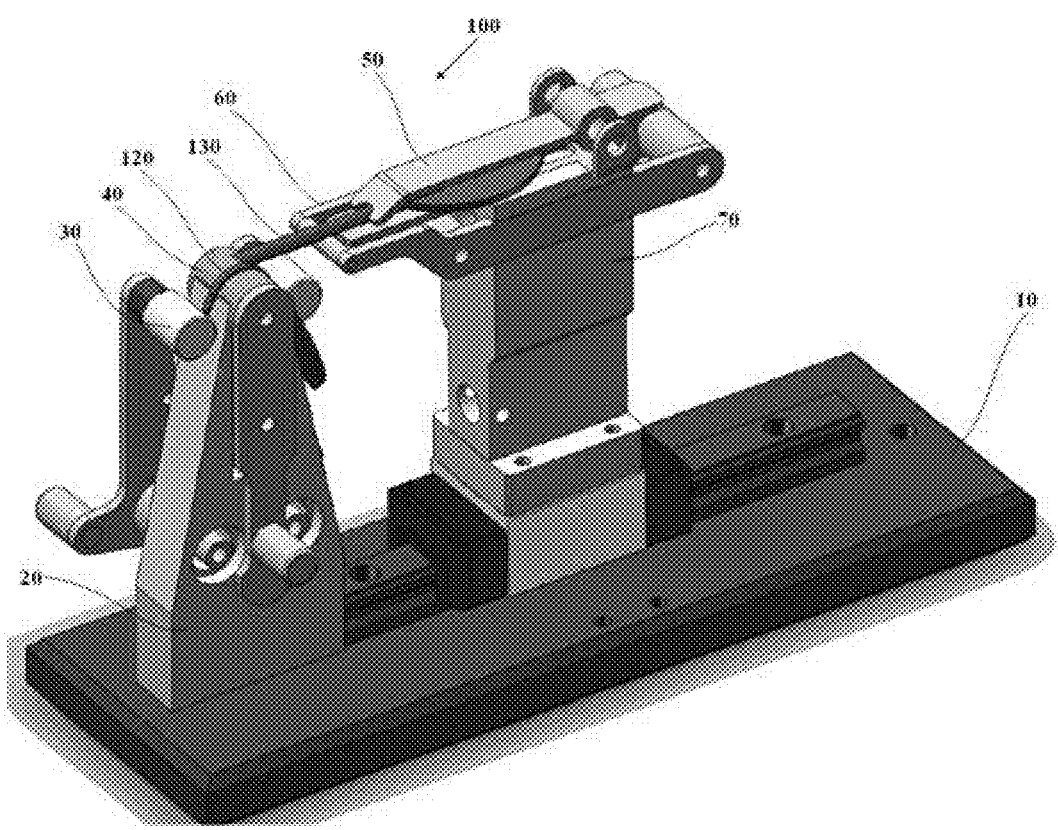
FIG. 4 is a schematic view of a combined holder holding a rootstock and a scion.

Reference is now made to FIGS. 3 and 4. A root stock 120 is fixed on the holder 20 in three points by the support 40 and members 30. A scion 130 is held in place by the jaw 50. The support 60 is adapted for supporting a scion terminal during cutting thereof.

It should be understood that at least one assembly 100 is loaded with the rootstock and scion 120 and 130, respectively, and is moved and carried by the loop conveyor 520 (FIG. 1). Rootstock and scion knives and grafting clip (not shown) are linearly positioned along the loop conveyor 520 and the above mentioned knives and clip are consecutively applied to the rootstock and scion 120 and 130.

It should be emphasized that during the grafting procedure, the scion holder 70 approaches close to the rootstock holder 20. Specifically, after cutting the scion terminal, the scion holder 70 approaches the rootstock holder 20 along a designated direction 75 so that the cut scion is brought to the cut rootstock. The assembly 100 is provided with a lever 80 adapted for angularly displacing along the designated direction 85.

Figure 5:
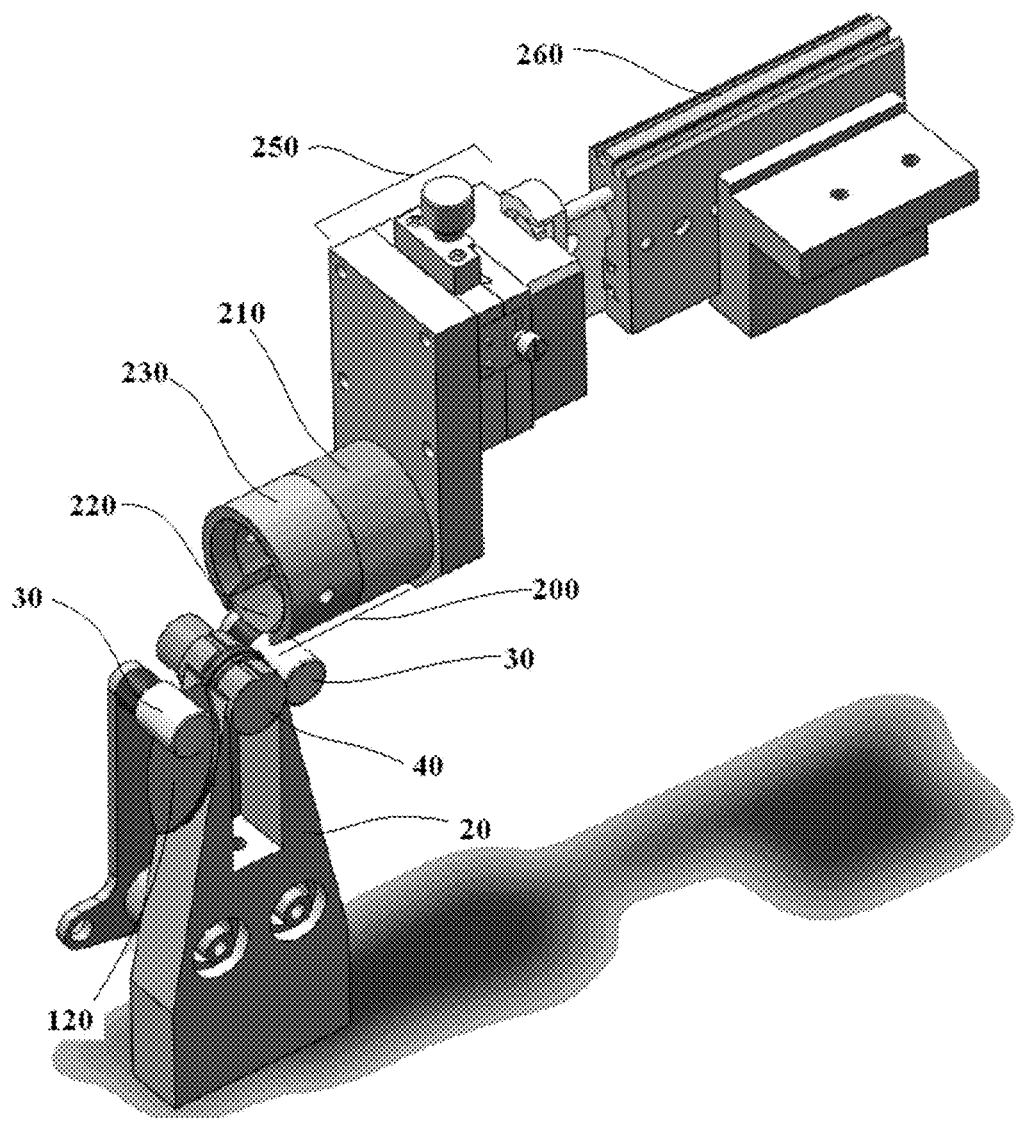
FIG. 5 is a schematic view of a manually operated clip holding a rootstock and a scion.

Reference is now made to FIG. 5, presenting an exemplary manually operated gripping device 140 designed for holding the rootstock and scion 120 and 130 together during a healing period.

Figure 6:
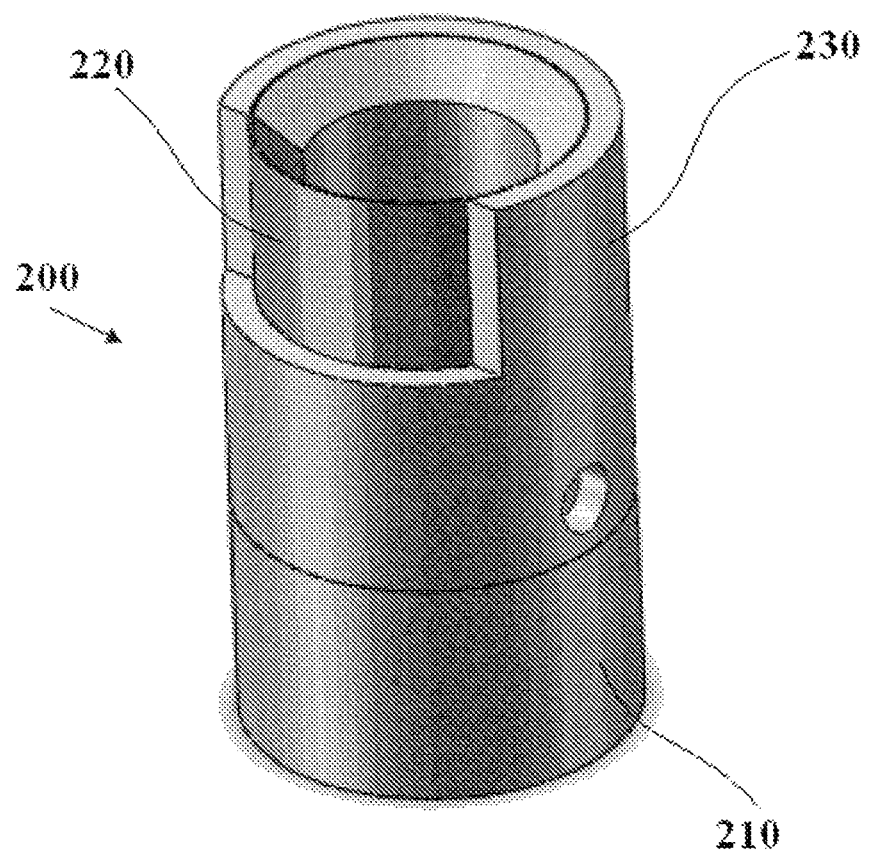
FIGS. 6 and 7 are schematic views of the cutter with the pre-stressed blade.
Figure 7:
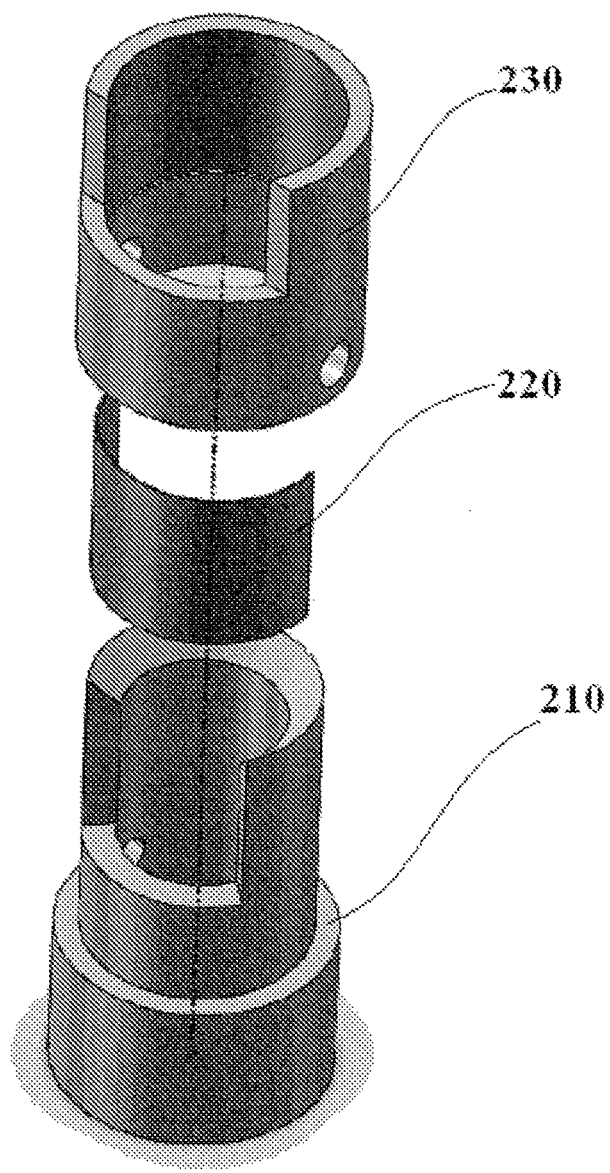

Reference is now made to FIGS. 6 and 7 presenting a cutter 200 adapted for hand and machine use. It should be appreciated that a cutting depth of the rootstock is a crucial parameter of the grafting process. Specifically, an excessively deep cut results in death of the rootstock. A cut in rootstock which is not deep enough results in continuation of rootstock development. It is crucial to provide a proper cutting depth, so that a correct rootstock and scion graft connection is achieved.

Cutting a rootstock and a scion can be performed by means of a blade of 250 um thickness. The aforesaid blade is mechanically deformable during the cutting process. As a result, a cut performed by the thin blade may not reproducible in its depth. Insufficient reproducibility of the cut depth results in the drawbacks described above. The present invention provides a solution: the cutter comprises a male member 210 and a female member 230 mounting a blade 220 therebetween in a pre-stressed bent state. The pre-stressed bent state of the blade provides a mechanical stability thereof under an operating load and, consequently, reproducibility of the cut depth.

Figure 8:
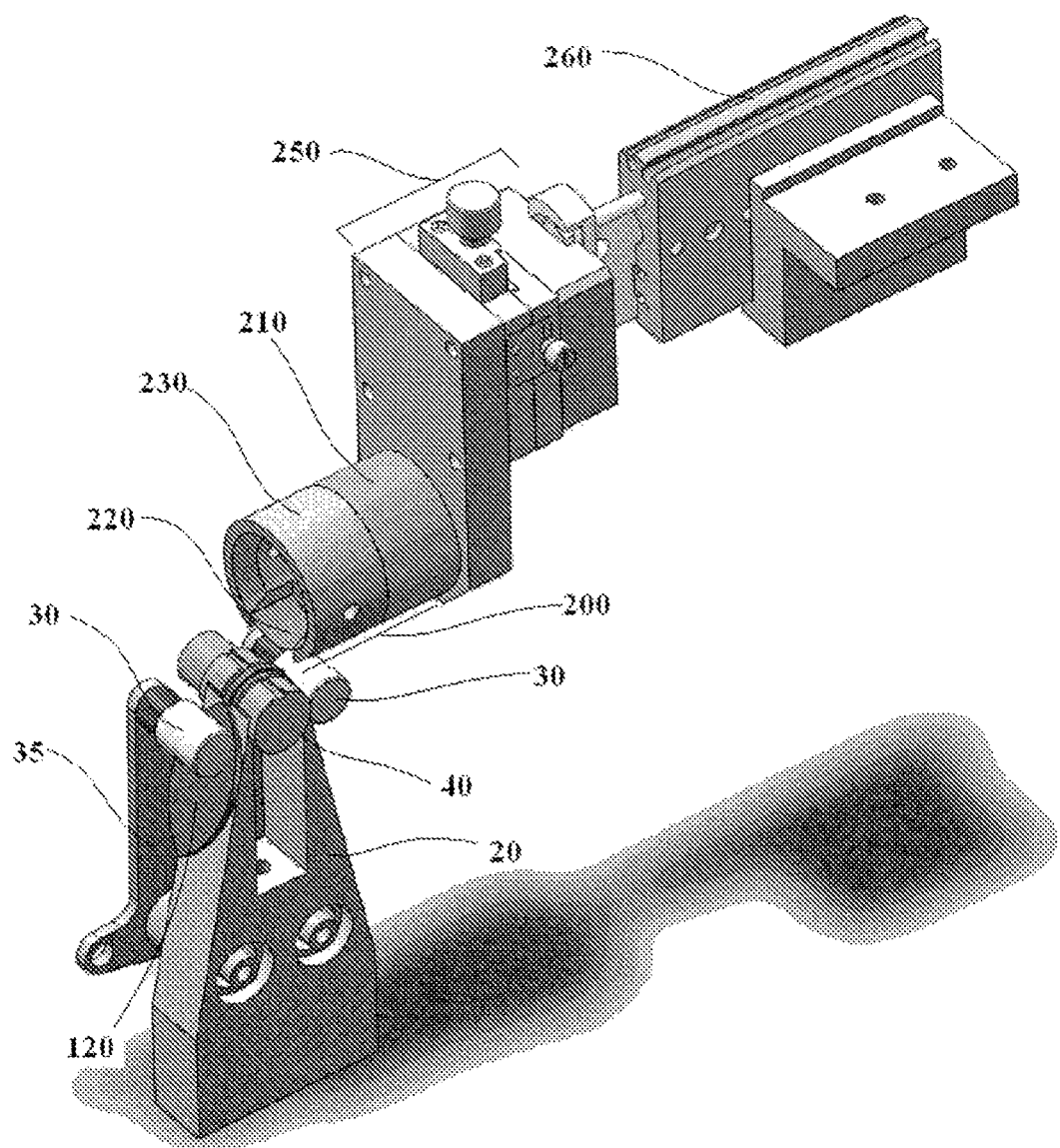
FIG. 8 a schematic view of a cutter assembly.

Reference is now made to FIG. 8, presenting an exemplary cutter assembly designed for cutting the rootstock 120. The cutter 200 is mechanically secured to a two-axis table 250, providing precise spatial positioning of the cutter 200. The rootstock 120 is cut due to linearly displacing the cutter 200 by means of a mechanical actuator 260.

TABLE 1

| Rootstock (commercial) | Scion (Different commercial varieties) | Grafted Plant (New) |
|---|---|---|
| Pumpkin | Melon | Grafted Melon |
| Melon | Melon | Grafted Melon |

TABLE 1-continued

| Rootstock (commercial) | Scion (Different commercial varieties) | Grafted Plant (New) |
|---|---|---|
| Pumpkin | Cucumber | Grafted Cucumber |
| Cucumber | Cucumber | Grafted Cucumber |
| Pumpkin | Water Melon | Grafted Water Melon |
| Water Melon | Water Melon | Grafted Water Melon |
| Tomato | Tomato | Grafted Tomato |
| Tomato | Eggplant | Grafted Eggplant |
| Eggplant | Eggplant | Grafted Eggplant |
| Basil | Basil | Grafted Basil |
| Pepper | Pepper | Grafted Pepper |

In accordance with the present invention, a plant graft production line for automatically grafting a rootstock and a scion is disclosed. The aforesaid plant graft production line comprises (a) a closed-loop conveyor; (b) at least one grafting assembly arranged for transporting along the conveyor; the assembly further comprising a rootstock holder for holding the rootstock and a scion holder for holding the scion; the holders arranged for at least partially superimposing the rootstock and scion; (c) stationary cutting mechanism for cutting exposed rootstock surface; (d) stationary cutting mechanism for cutting exposed scion surface to be; and (e) stationary clipping mechanism for clipping the superimposed rootstock and scion together.

It is a core feature of the present invention to provide the rootstock holder arranged so as to create a curvilinear plane along which the rootstock is conformed thereby presenting a curved cutting target for the cutting mechanism.

It is another core feature of the present invention to provide the rootstock holder is arranged as an at least three point grip. The holder comprises a supporting member having a rounded top arranged to support the rootstock and clamping elements. The cutting mechanism is arranged to angularly cut the scion at a predetermined angle.

In accordance with one embodiment of the present invention, the rootstock holder is configured to bend the rootstock such that the rootstock is predeterminedly positioned for cutting at a predetermined angle.

In accordance with another embodiment of the present invention, the conveyor is ramified into at least two branches for performing at least one operation.

In accordance with a further embodiment of the present invention, the conveyor is ramified into at least two branches for performing at least one operation.

In accordance with a further embodiment of the present invention, the cutting mechanism is arranged to angularly cut the scion at a predetermined angle of about 30°

In accordance with a further embodiment of the present invention, the grafting assembly is arranged for transporting along a guiding rail.

In accordance with a further embodiment of the present invention, the scion holder comprises a clip for holding the scion.

In accordance with a further embodiment of the present invention, the scion holder comprises a support for a cut scion.

In accordance with a further embodiment of the present invention, the grafting assembly is configurable to a first position for loading the rootstock and scion and a second position for superimposing the cut rootstock and the cut scion.

In accordance with a further embodiment of the present invention, the grafting assembly comprises a mechanism arranged for approaching the rootstock and scion holders; the mechanism is selected from the group consisting of a mechanical mechanism, an electrical mechanism, a pneumatic mechanism and any combination thereof.

In accordance with a further embodiment of the present invention, the cutting mechanism further comprises (a) a cylindrical holder and (b) a plain blade placed into the holder under tension the blade characterized by a convex curve edge of the tensioned blade for cutting the rootstock or scion.

In accordance with a further embodiment of the present invention, the cylindrical holder further comprises a male member and a female member which keep the plain blade therebetween in a pre-stressed bent state.

In accordance with a further embodiment of the present invention, the support is adapted to be drawn aside when assembly is in the second position.

In accordance with a further embodiment of the present invention, the grafting assembly is transported along a predetermined path.

In accordance with a further embodiment of the present invention, a hybrid plant graft produced by a method comprises the steps of (a) obtaining a plant graft production line for automatically grafting a rootstock and a scion; the plant graft production line comprising (i) at least one grafting assembly arranged for transporting therealong; the assembly further comprising a rootstock holder for holding the rootstock and a scion holder for holding the scion; the holders arranged for at least partially superimposing the rootstock and scion; (ii) cutting mechanism for cutting exposed rootstock and scion surfaces to be superimposed; (iii) clipping mechanism for clipping the superimposed rootstock and scion together; (b) mounting the rootstocks and the scions in the rootstock holder and the scion holder respectively and operating the plant graft production line and (c) operating the plant graft production line.

A further core feature of the present invention is to provide the rootstock holder arranged as a three point grip; the holder comprising a supporting member having a rounded top arranged to support the rootstock and clamping elements; the cutting mechanism arranged to angularly cut the scion at a predetermined angle.

In accordance with a further embodiment of the present invention, the hybrid graft is selected from the group consisting of grafted melon, grafted cucumber, grafted eggplant, grafted tomato and grafted basil.

The invention claimed is:

1. A plant graft production line for automatically grafting a rootstock and a scion; said plant graft production line comprises
   a. a closed-loop conveyor;
   b. at least one grafting assembly arranged for transporting along said conveyor; said at least one grafting assembly further comprising a rootstock holder for holding said rootstock and a scion holder for holding said scion; said holders arranged for at least partially superimposing said rootstock and scion;
   c. a stationary cutting mechanism for cutting exposed rootstock surface;
   d. a stationary cutting mechanism for cutting exposed scion surface to be;

e. a stationary clipping mechanism for clipping said superimposed rootstock and scion together;

wherein said rootstock holder is arranged so as to provide a curvilinear plane along which said rootstock is conformed thereby presenting a curved cutting target for said cutting mechanism.

2. The plant graft production line according to claim 1, wherein said rootstock holder is configured to bend said rootstock such that said rootstock is predeterminedly positioned for cutting at a predetermined angle.

3. The plant graft production line according to claim 1, wherein said conveyor is ramified into at least two branches for performing at least one operation.

4. A hybrid plant graft according to claim 1, wherein said hybrid graft is selected from the group consisting of grafted melon, grafted cucumber, grafted eggplant, grafted tomato and grafted basil.

5. A cutting tool useful for grafting; said tool comprising
a) a female member and
b) a plain blade placed into said female member; wherein said female member has a cylindrically configured internal wall; said plain blade is placeable onto said internal wall, said tool comprises a male member pressing said blade against said wall in a pre-stressed bent state such that an edge of said blade is convexly shaped for cutting a rootstock or a scion.

6. The cutting tool according to claim 5 provided with means for connecting said tool to a plant graft production line.

7. The cutting tool according to claim 5 provided with means for adjusting a cutting angle.

* * * * *